March 29, 1927.
A. L. POWELL
1,622,842
MECHANICAL MOVEMENT OF THE PLANETARY GEAR TYPE
Filed Nov. 9, 1923  8 Sheets-Sheet 3
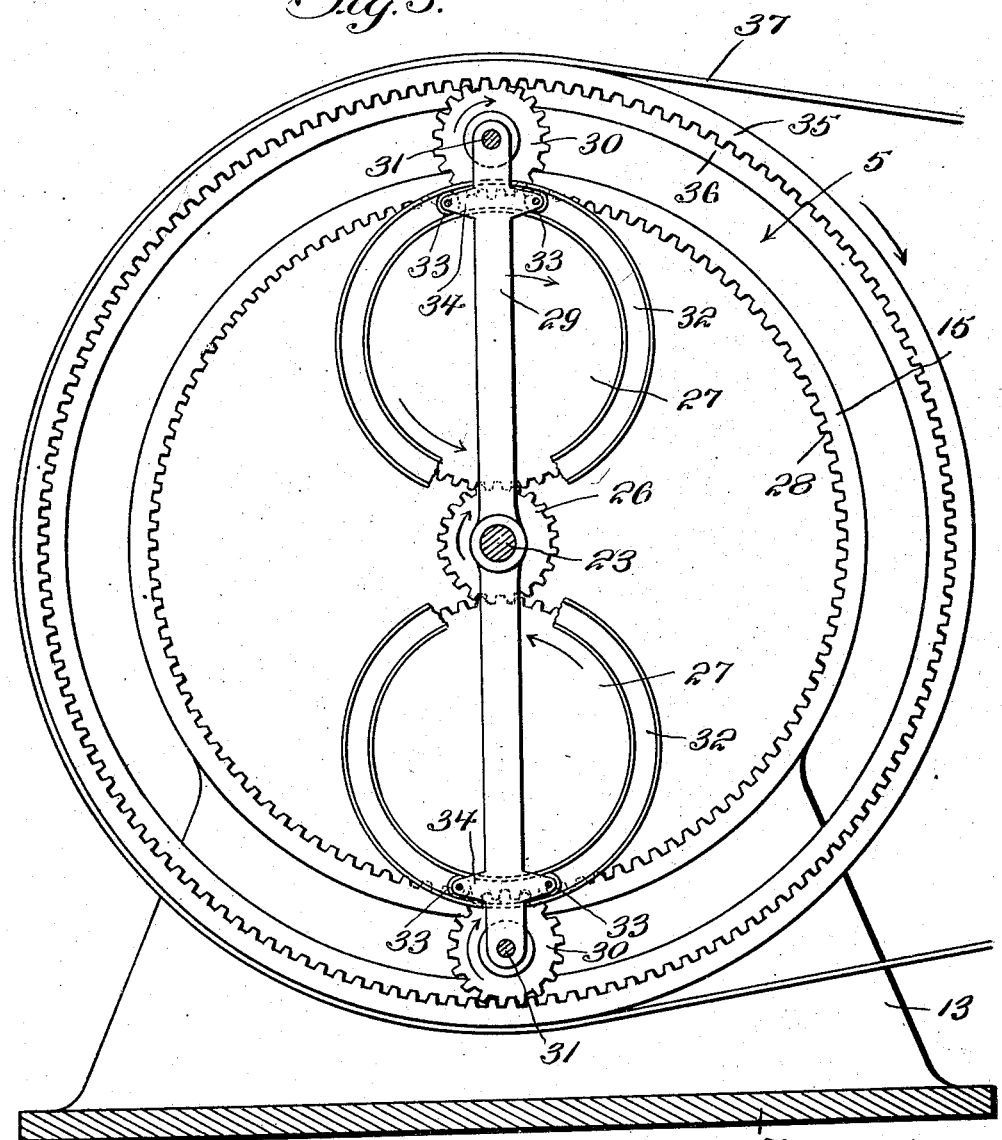
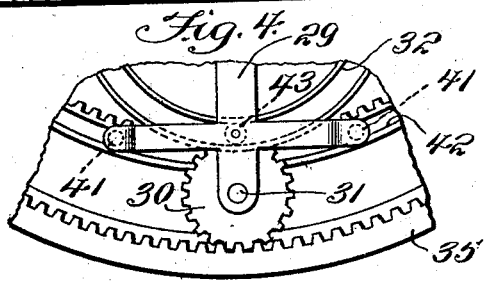
Inventor
A. L. Powell

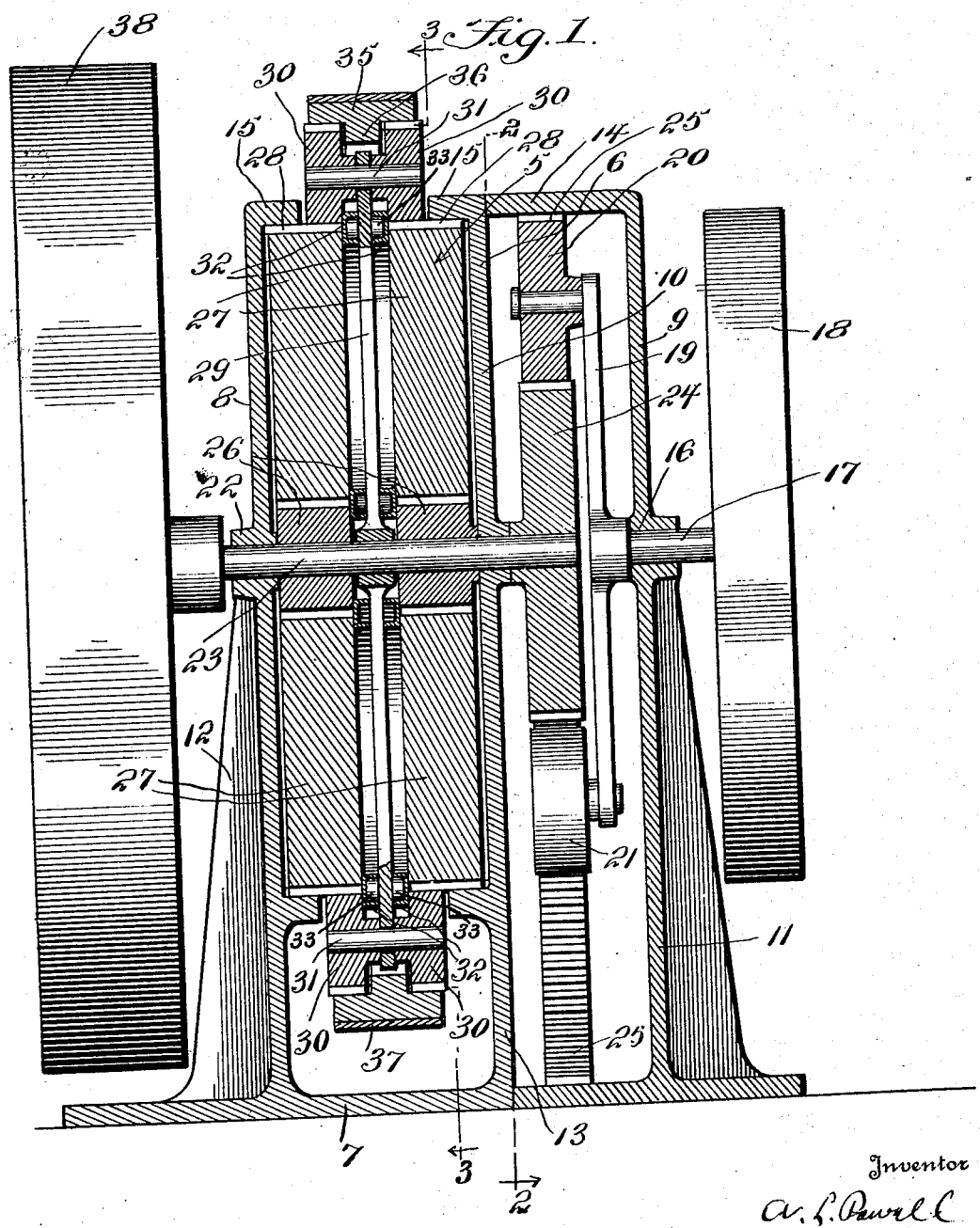

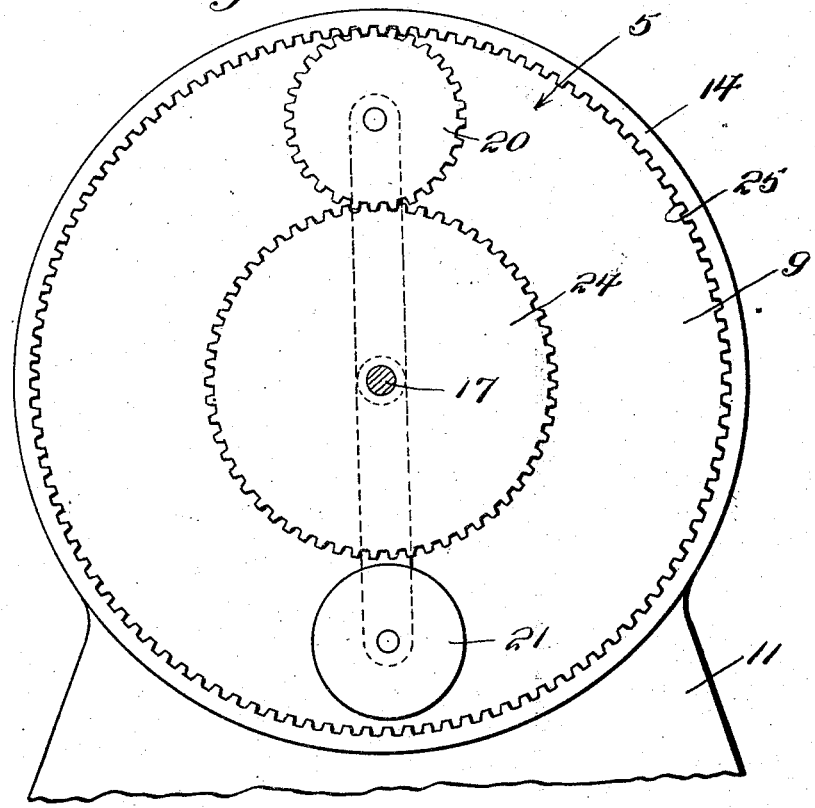
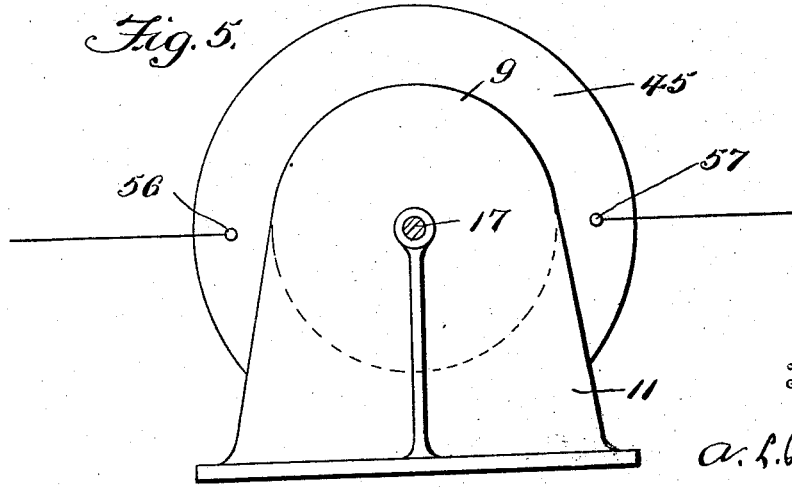

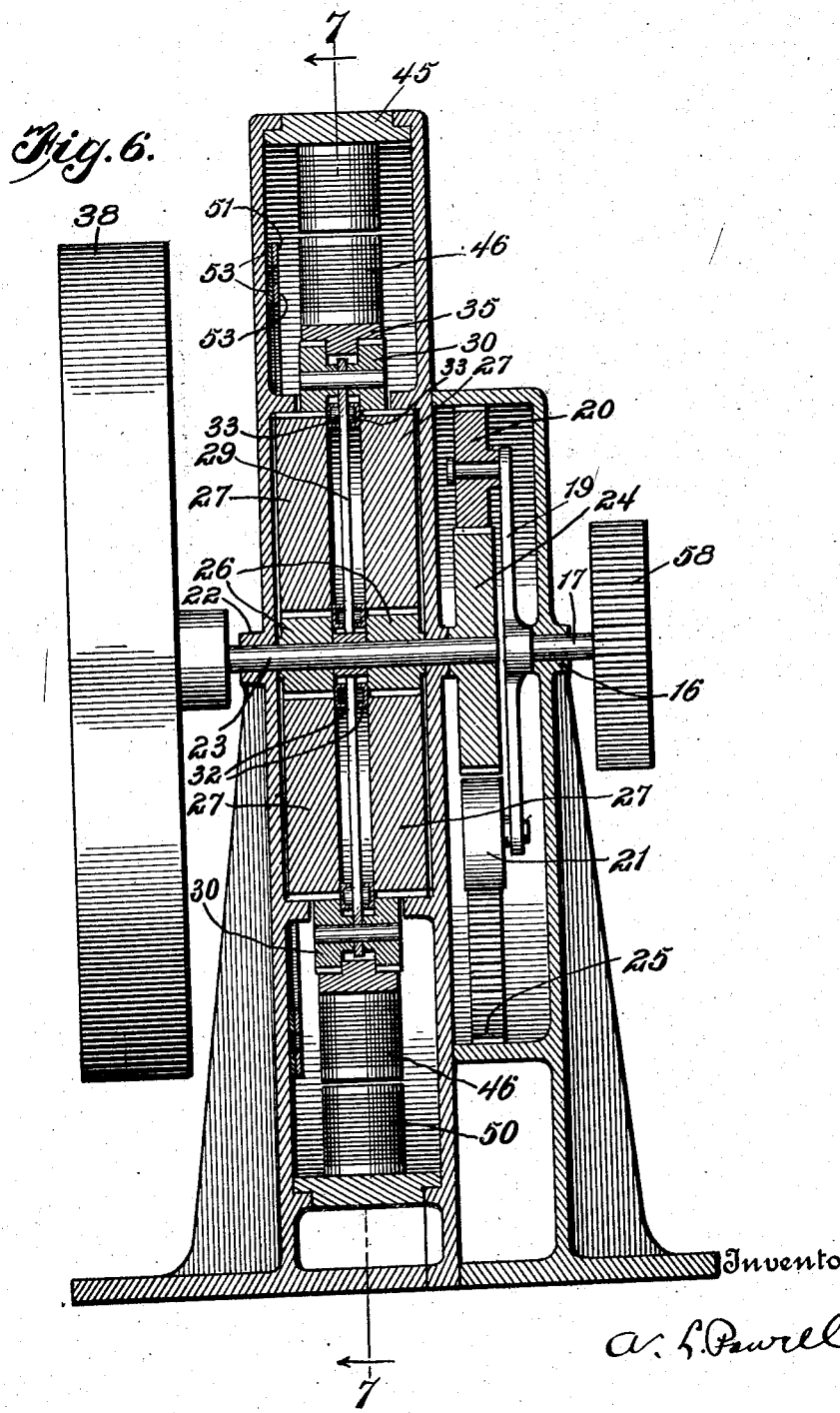

March 29, 1927. 1,622,842
A. L. POWELL
MECHANICAL MOVEMENT OF THE PLANETARY GEAR TYPE
Filed Nov. 9, 1923 8 Sheets-Sheet 5

Inventor
A. L. Powell

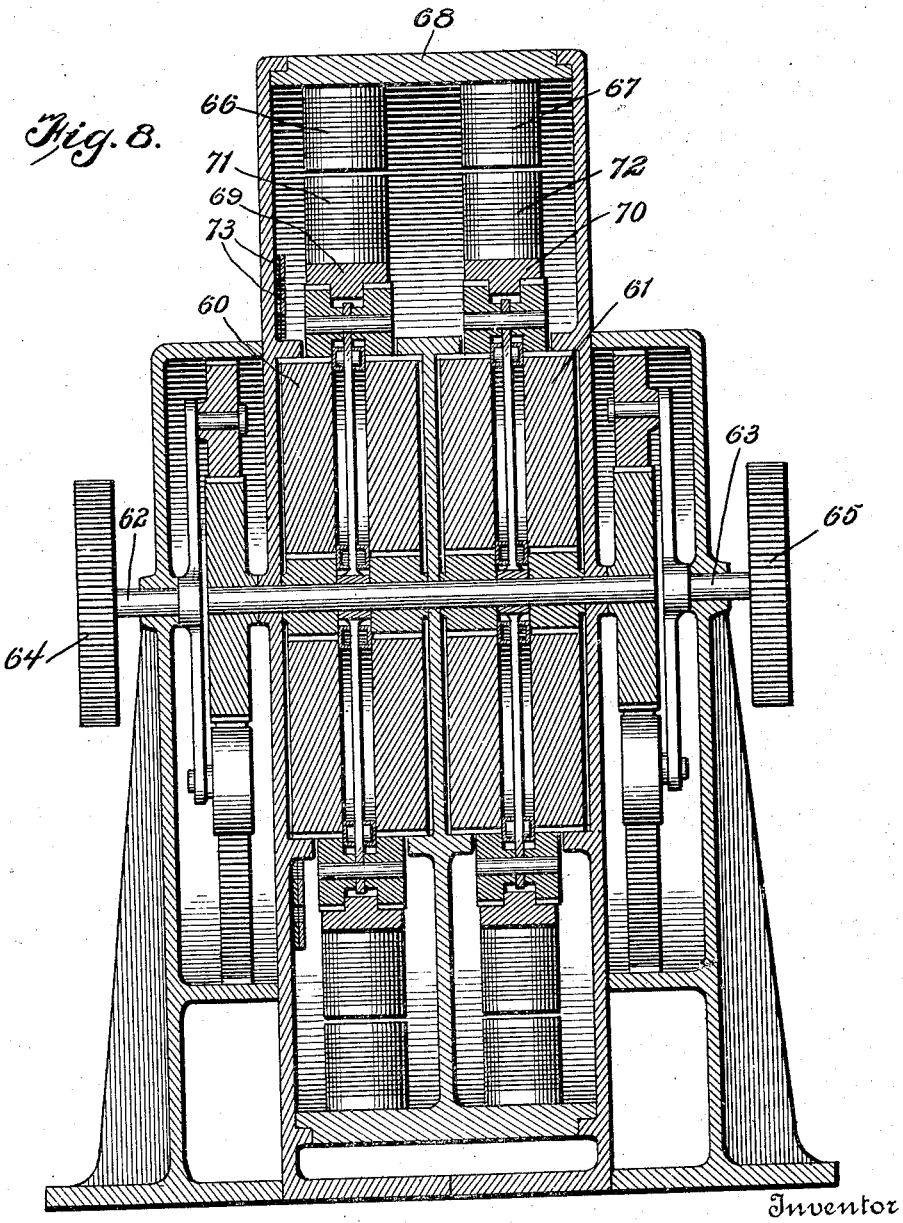

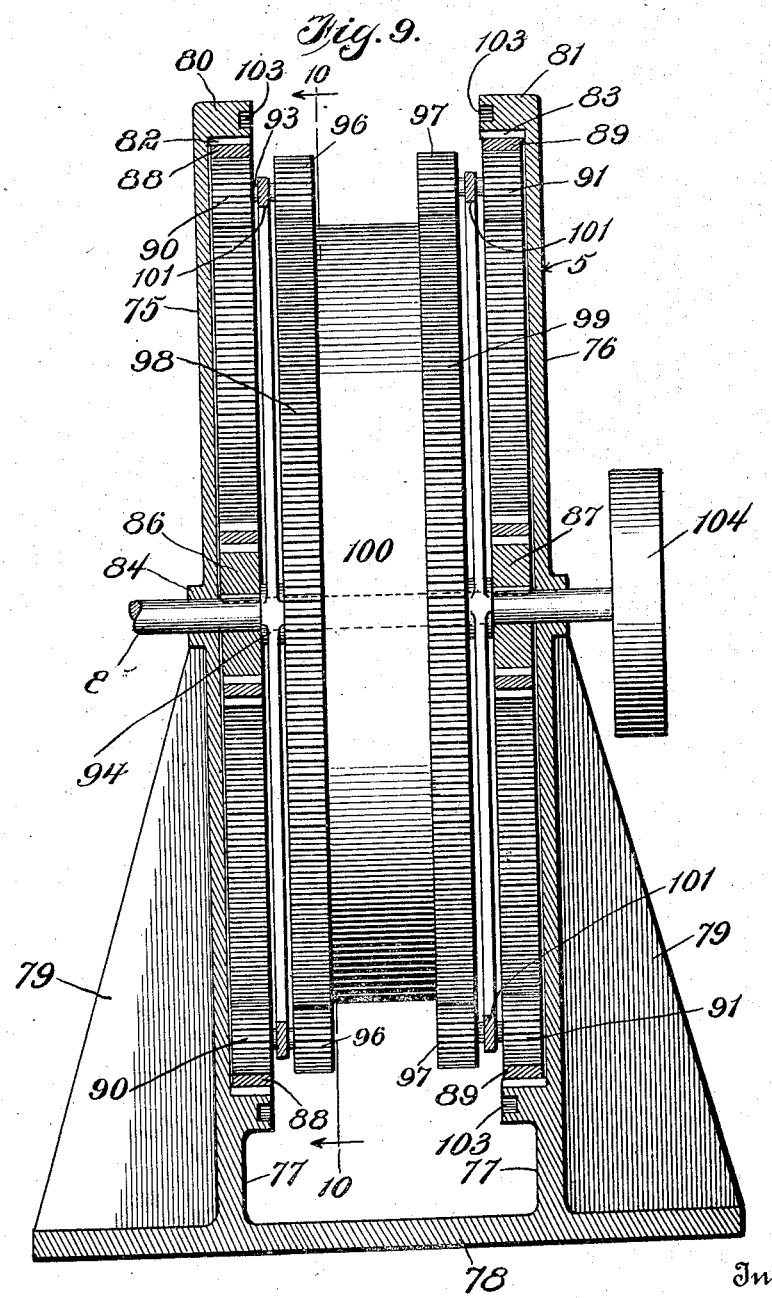

March 29, 1927.　　　　A. L. POWELL　　　1,622,842
MECHANICAL MOVEMENT OF THE PLANETARY GEAR TYPE
Filed Nov. 9, 1923　　　8 Sheets-Sheet 8
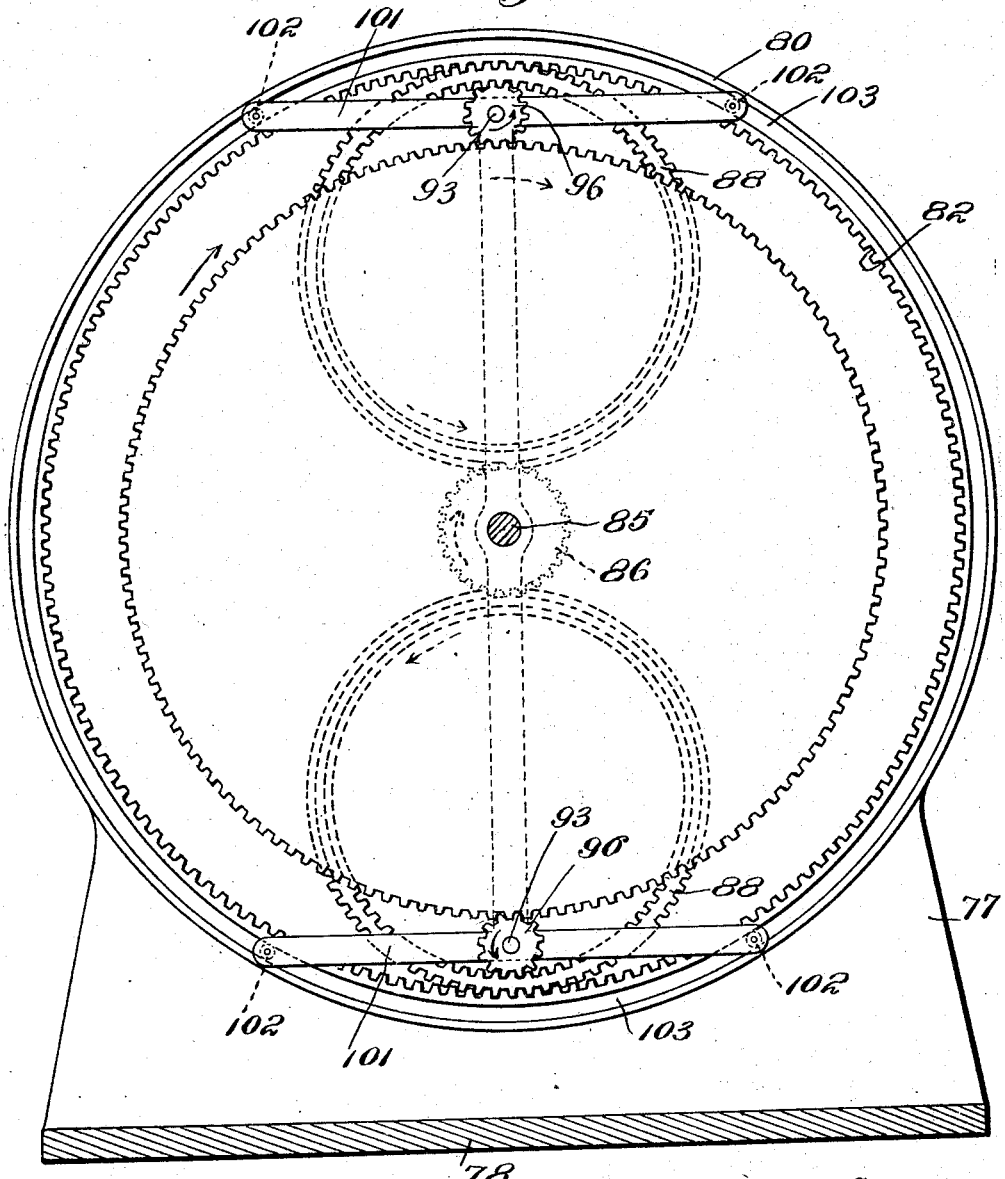

Patented Mar. 29, 1927.

1,622,842

UNITED STATES PATENT OFFICE.

ALVAH L. POWELL, OF MILES CITY, MONTANA, ASSIGNOR TO A. L. POWELL POWER COMPANY, INCORPORATED, A CORPORATION OF MONTANA.

MECHANICAL MOVEMENT OF THE PLANETARY-GEAR TYPE.

Application filed November 9, 1923. Serial No. 673,854.

This invention relates to mechanical movements and the primary object of the invention is to provide an improved mechanical movement in which a novel system of gearing is used and which is so constructed as to obtain a relatively large leverage so that a mechanical advantage can be obtained over the force initially applied thereto, and thereby facilitate the operation of any machine, motor, or other device.

Another object of the invention is to provide a novel mechanical movement of the planetary gear type in which an ultimate mechanical advantage of two to one and over, is gained, thus permitting any device, machine or motor to be easily driven.

A further object of the invention is to provide an improved mechanical movement of the planetary gear type which can be effectively incorporated in a generator so as to permit the easy operation thereof by a comparatively small force.

A further object of the invention is to provide an improved mechanical movement, which is compactly arranged, one that is durable and efficient in use, and one that can be placed upon the market at a reasonable cost.

With these and other objects in view the invention consists in the novel construction, arrangement and formation of parts, as will be hereinafter more specifically described, claimed and illustrated in the accompanying drawings, in which:

Figure 1 is a vertical transverse section through the improved device.

Figure 2 is a longitudinal section taken on the line 2—2 of Figure 1.

Figure 3 is a similar section taken on the line 3—3 of Figure 1.

Figure 4 is a fragmentary vertical section through a slightly modified type of the device.

Figure 5 is an elevation of a generator in which the improved mechanical movement is embodied.

Figure 6 is a vertical section through the generator.

Figure 8 is a vertical section through a generator embodying a pair of the improved mechanical movements.

Figure 9 is a vertical section through another form of the movement, and

Figure 10 is a longitudinal section through the same taken on the line 10—10 of Figure 9.

Figure 7:
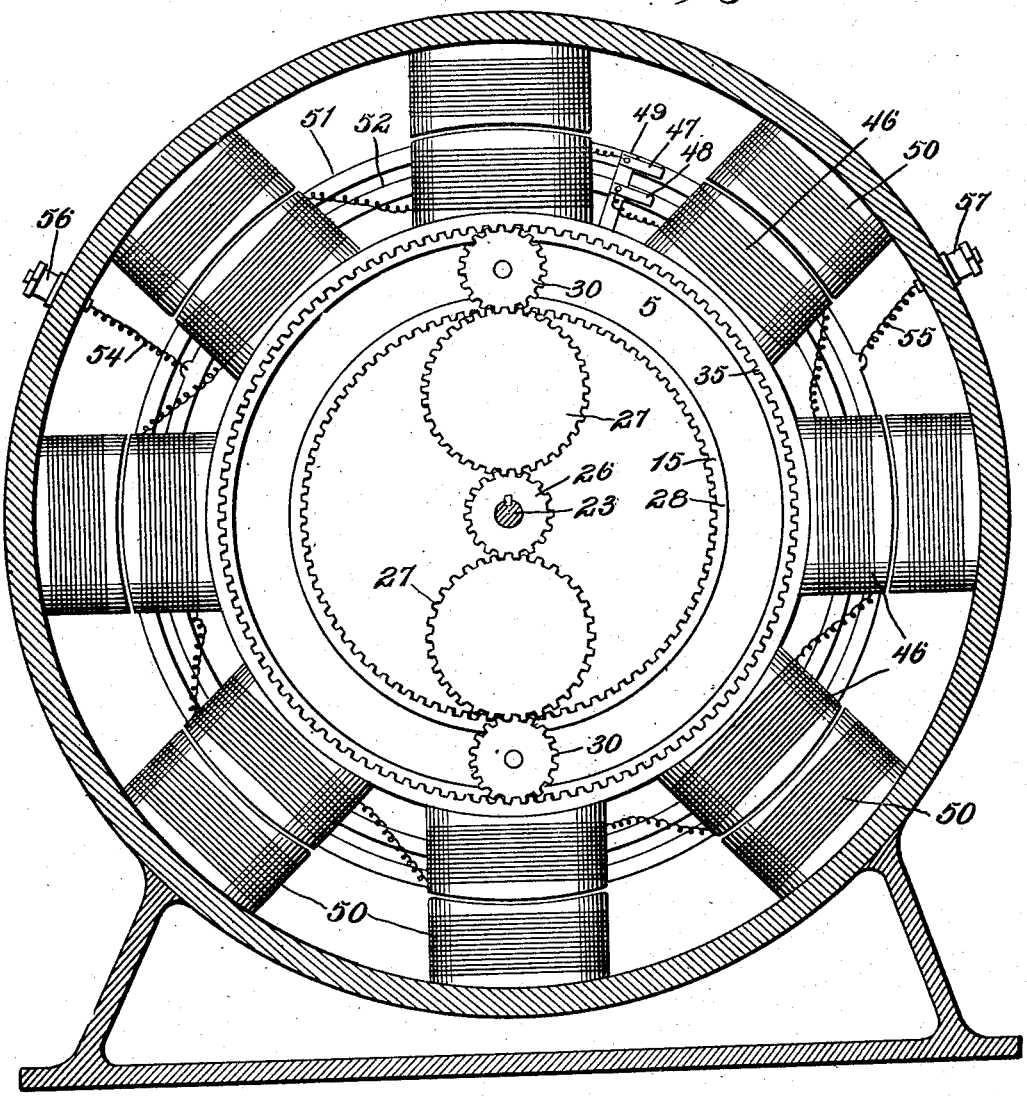
Figure 7 is a longitudinal section taken on the line 7—7 of Figure 6.

Referring to the drawings in detail, wherein similar reference characters designate corresponding parts throughout the several views, the numeral 5 generally indicates the improved motor, which includes a suitable housing or casing 6 that is adapted to enclose the rotating parts of the movement. This housing or casing 6 comprises a base plate 7 which may be bolted or otherwise secured to any suitable support, and vertically disposed side walls 8 and 9 and a vertical partition plate 10. The side walls 8 and 9 and the partition plate 10 are of a disc-shaped form and are connected with the base plate by suitable side plates 11, which are braced by inclined ribs 12 which are formed integral with the base plate and side walls. The central partition plate 10 may also be connected with the base plate 7 by a suitable rib or the like 13. The side plate 9 is connected with the partition plate 10 by a substantially cylindrical end wall 14. The side wall 8 and the partition plate 10 have formed on their peripheries inwardly extending annular flanges 15 which terminate short of each other. The side plate 9 has a bearing 16, which rotatably supports a drive shaft 17. This drive shaft is provided with a suitable pulley 18, by which the shaft may be driven. This pulley, as shown, has a radius of substantially 12 inches, although this may be varied if so desired. The inner end of the shaft 17 carries a diametrically extending arm 19, one terminal of which supports for rotary movement a relatively small gear wheel 20. The opposite end of the arm 19 carries a weight 21 which is adapted to counterbalance the gear 20 so as to permit the operation of the shaft by a comparatively small force.

The side plate 8 and the partition 10 are provided with aligned bearings 22 which rotatably support a shaft 23, which is in axial alignment with the shaft 17. The inner end of the shaft 23 extends outwardly of the partition wall 10 and has keyed or otherwise secured thereto, a relatively large gear wheel 24 with which the relatively small gear wheel 20 is adapted to mesh. The relatively small gear wheel 20 also meshes with an annular internal gear 25 which is carried by the end wall 14. Thus it can be seen that upon rotation of the shaft 17 the gear 20 will be carried around therewith and thus rotate the gear 24. As the gear 20 is moved around in the casing by the arm 19 the gear 20 is rotated by meshing with the annular internal gear 25. Thus it can be seen that the gear 20 is not only carried by the arm 19 but is also rotated by the internal gear 25. The shaft 23 has keyed or otherwise secured thereto a pair of spaced relatively small shaft gears 26 which are arranged intermediate the side plate 8 and the partition plate 10. These gears in turn mesh with relatively large planetary gears 27 which are formed relatively broad and are adapted to mesh with stationary internal gears 28 formed on the inner surface of the inwardly extending flanges 15. Inasmuch as the planetary gears 27 are more than twice as large as the gears 26 a leverage of over two to one is gained at this point. Rotatably mounted upon the shaft 23 intermediate the gears 26 is an arm 29 carrying at each end thereof a pair of external gears 30. The external gears 30 are relatively small and are rotatably mounted upon pins 31 carried by the outer terminals of the arms. These gears mesh with the relatively large planetary gears 27 and are rotated thereby. The inner faces of the planetary gears 27 carry annular raceways 32 which receive rollers 33 carried by outwardly extending lugs 34 formed on the arm 29. The relatively small gears 30 mesh with an annular internal gear 35, which is arranged around the housing or casing. The annular gear 35 is adapted to be rotated by the relatively small gears 30 and the same is provided with an inwardly extending annular rib 36 which prevents lateral movement of the gear 35 in relation to the small gears 30. The relatively large internal gear 35 constitutes the drive pulley by means of which work may be driven. As shown, the same has a pulley belt 37 trained around the same.

In operation of the improved motor, when the shaft 23 is rotated by the gear 24 the same will rotate the gears 27. As the gears 27 are moved around in the casing by the gears 26 the same will be rotated by the annular internal gears 28 carried by the flanges 15 and the same will cause the rotation of the small gears 30 which in turn will transmit their movement to the internal annular ring gear 35.

Thus it can be seen that an effective mechanical movement is provided which will increase the mechanical advantage of the force delivered thereto more than two to one. The arrangement of the movement is such that a very compact structure is obtained and as the parts thereof are so proportioned very little wear will result from the continual use of the device.

A relatively large balance wheel 38 is keyed to the shaft 23 so that the operation of the device will be steady and uninterrupted.

In Figure 4 is illustrated a slightly modified form of the mechanical movements and in this form it is shown that the means for connecting the arm 29 with the gears 27 may be varied without changing the operation of the device. In this form the arm 29 is provided with relatively long right angular extending legs, the terminals of which are provided with rollers 41 which are adapted to ride in annular grooves 42 which are formed in the inner face of the flanges 15 which carry the internal annular gear 28. The portion of the arm 29 intermediate the legs are provided with rollers 43 which are adapted to engage the annular raceways 32 formed on or carried by the gears 27. Thus it can be seen that the arm 29 is steadied by means of the rollers 41.

The operation of this form is exactly like the form just described, the only difference being in the formation of the terminals of the arms 29.

In Figures 5, 6 and 7 is illustrated the improved mechanical movements used in connection with a generator, so that the generator may be easily driven.

The center casing 45 of the generator surrounds the relatively large ring gear 35, which forms the rotor for the generator. The outer surface of the ring gear has connected thereto in any prescribed manner the rotor coils 46 which are connected in series, and the same are connected with the brushes 47 and 48 which are secured to a radially extending arm 49 which is secured to the ring gear 35. Any prescribed number of rotor coils can be provided and, as shown, there are eight in number. The center casing carries a corresponding number of stator coils 50 and as the rotor is operated by the improved mechanical movement the same are excited and the current is taken off through the medium of the brushes 47 and 48 engaging a pair of annular metallic electric conducting rings 51 and 52, which are secured to suitable insulating rings 53 which are secured to the side wall of the stator casing. The annular metallic rings 51 and 52 are connected by suitable wires 54 and 55, to binding posts 56 and 57, to which the lead wires for conducting the current may be connected.

From the foregoing, it can be seen that efficient means has been provided for incorporating the improved mechanical movement in a generator.

In this form a drive gear wheel 58 is connected to the shaft 17 in lieu of the pulley wheel 18.

In Figure 8 is shown a means by which a pair of mechanical movements may be incorporated in a generator and in this form the intermediate gears are indicated by the numerals 60 and 61 and the drive shafts 62 and 63 thereof extend from the opposite sides of the machine. These shafts 62 and 63 have drive wheel gears 64 and 65 keyed thereto by means of which the same are driven. In this form a double row of stator coils 66 and 67 are provided and the same are secured in any prescribed manner to the stator casing 68 and these coils extend radially therefrom. Each of the drive annular gears 60 and 70 of the pairs of mechanical movements have secured thereto the radially extending rotor coils 71 and 72. The current is taken from the rotor coil in the same manner as the preceding form just described and one side wall of the stator casing is provided with the annular collector rings 73 which are adapted to engage the brushes carried by the ring gears or rotor.

In Figures 9 and 10 is illustrated another form of improved mechanical movement and in this form a pair of side plates 75 and 76 are provided, and the same are of a substantially disc shape and are secured by means of flanges or the like 77 to a base plate 78. These disc shaped side plates or walls 75 and 76 may be braced by suitable diagonal ribs or webs 79 and, as shown, these webs are cast or formed integral with the base plate 78 and the side plates or walls 75 and 76. Inwardly extending annular flanges 80 and 81 are formed on the peripheries of the disc shaped side plates or walls 75 and 76 and the inner surface of these flanges are provided with internal ring gears 82 and 83. The side walls or plates 75 and 76 are provided with aligned bearings 84 which support for rotary movement the transversely extending drive shaft 85 and this shaft has secured thereto adjacent to the outward end inward of the side walls 75 and 76 the relatively small drive gears 86 and 87. These relatively small drive gears 86 and 87 have meshing therewith pairs of relatively large ring gear wheels 88 and 89 and these gears in turn mesh with relatively small gears 90 and 91. The ring gears mesh with the internal ring gears 82 and 83. Thus it can be seen that when the shaft 85 is rotated the gears 88 and 89 will be operated by the gears 86 and 87 and as the same are moved around they will cause the rotation of the relatively small gears 90 and 91. These gears 90 and 91 are rotatably mounted on pins 93 carried by the opposite terminals of a pair of arms 94, which are rotatably mounted on the shafts 85 inward of the drive gears 86 and 87. The pins 93 also have keyed thereto gears 96 and 97 which are approximately of the same diameter as the gears 90 and 91. Thus it can be seen that when the gears 90 and 91 are rotated the gears 96 and 97 will be rotated therewith. These gears 96 and 97 engage at substantially diametrically opposite points annular gears 98 and 99 which are formed on the periphery of the drum 100, from which the work is adapted to be taken. The terminals of the arms 94 also carry outwardly extending right angular legs 101 which carry at their free terminals rollers 102 which engage in annular grooves 103 formed in the inner faces of the right angular inwardly extending flanges 80 and 81. A drive pulley 104 is secured to the shaft 85 for permitting the shaft to be driven by any suitable motor, engine or the like. While the drive pulley 104 has been shown secured to one end of the shaft, it is to be understood that the shaft can be driven from either end or both ends simultaneously.

The operation of this form is similar to the form shown in Figures 1 and 3 with the exception that the relatively large pulley 100 from which the work is taken is driven from its surface by the drive gears 96 and 97 instead of from its inner surface. The provision of these sets of gears 88 and 89 located on opposite sides of the relatively large pulley 100 balances the machine and permits the easy and smooth operation thereof. The pairs of gears 88 and 89 have a diameter at least twice as great as the diameter of the gears 86 and 87. Thus it can be seen that a leverage of two to one or more is gained at this point.

Changes in detail may be made without departing from the spirit or scope of this invention, but what I claim as new is:

1. In a mechanical movement of the planetary gear type, a stationary ring gear, a rotatable shaft, a gear carried by said shaft, a planetary gear adapted to mesh with the ring gear and with the gear on the shaft, a gear operatively connected with said shaft and adapted to mesh with the said planetary gear at a diametrically opposite point from the gear carried by the shaft and means whereby power may be taken from the gear operatively connected with the shaft at a point diametrically opposite from the point of contact with the planetary gear.

2. In a mechanical movement, a casing, a relatively large rotatable internal ring gear surrounding the casing, relatively large internal stationary ring gears arranged in the casing, a rotatable shaft supported by the casing, means for rotating said shaft, gears keyed to said shaft, planetary gear wheels meshing with said gears and with the stationary internal ring gears, and external gears meshing with the planetary gear wheels and with said relatively large rotatable ring gear.

3. In a mechanical movement of the planetary gear type, a casing, stationary internal gears carried by the casing, a rotatable shaft mounted in said casing, means for rotating said shaft, a pair of relatively small gear wheels keyed to said shaft, planetary gear wheels meshing with the internal gears and the small gear wheels, an outwardly extending arm rotatably mounted on said shaft, annular raceways secured to the inner faces of said planetary gear wheels at the pitch line thereof, rollers carried by said arms and engaging with said raceways, pins carried by the terminals of said arms, relatively small external gears rotatably mounted on said pins and meshing with the planetary gears and a relatively large power-delivering annular gear surrounding said shaft and meshing with the small external gears carried by the terminals of the arms.

4. In a mechanical movement of the planetary gear type, a casing, a stub shaft secured to said casing, a second shaft rotatably mounted in said casing in axial alignment with the stub shaft, means for driving said stub shaft, radially extending diametrically aligned arms carried by the inner end of said stub shaft, a pin carried by the outer terminal of one of the arms, a relatively small gear rotatably mounted on said pin, a balance weight carried by the outer end of the opposite arm, a relatively large gear wheel keyed to said second shaft and meshing with and rotated by the gear wheel carried by the arm, a stationary annular ring gear carried by the casing, the first mentioned gear wheel meshing with said stationary ring gear diametrically opposite to its point of engagement with the relatively large gear wheel, a pair of relatively small gear wheels keyed to said second mentioned shaft, a rotatable arm mounted upon said second mentioned shaft intermediate the relatively small drive gear wheels inwardly extending spaced annular flanges formed on said casing and surrounding said shaft, internal annular race gears formed on said inwardly extending flanges, planetary gear wheels meshing with the relatively small drive gear wheels and the stationary ring gears at diametrically opposite points, the planetary gear wheels extending inwardly of said pair of stationary ring gears, annular raceways carried by the inner faces of the planetary gear wheels at their pitch line, rollers carried by the arms rotatably mounted on said second mentioned shaft and arranged in said raceways, the terminals of the arms mounted on said second mentioned shaft extending beyond said flanges, outwardly extending pins carried by the terminals of said arms, relatively small gear wheels keyed to said pins and adapted to mesh with said planetary gears and an annular work-delivering gear surrounding said casing, and meshing with the relatively small gear wheels carried by the arms.

5. In a device of the class described, a generator including a casing, a shaft journaled in the casing, means for rotating the shaft, a pair of relatively small drive gears keyed to the shaft, a pair of relatively large planetary gears meshing with the last mentioned gears, a rotor, annular ring gears formed on the rotor, relatively small gear wheels meshing with the planetary gears and the internal ring gear carried by the rotor, stationary internal ring gears carried by the casing and meshing with the planetary gears, radially extending rotor coils carried by the rotor, a plurality of stator coils, a pair of collector rings, brushes carried by the rotor and engaging said collector rings, means electrically connecting the rotor coils with the collector rings, binding posts, and means electrically connecting the collector rings with the binding posts.

6. In a generator, a casing, a stub shaft, means for operating the stub shaft, a second shaft, a pair of outwardly extending arms secured to the inner end of the stub shaft, a stationary internal ring gear, a relatively large gear wheel keyed to the second mentioned shaft, a relatively small gear wheel rotatably carried by the outer terminal of one arm and meshing with the relatively large gear wheel and the stationary ring gear at diametrically opposite points, a balance weight carried by the outer terminal of the other arm, a pair of spaced gears keyed to the second mentioned shaft, a pair of stationary internal ring gears, a pair of planetary gears meshing with the small drive gear wheels and pair of stationary ring gears at diametrically opposite points, a pair of outwardly extending arms rotatably carried by the second mentioned shaft, means rotatably supporting the planetary gears at their pitch lines by said arms, a pair of relatively small gear wheels meshing with the planetary gears, said last mentioned gear wheels being carried by the outer terminals of the arms, a rotor, a plurality of radially extending rotor coils carried by the outer surface of the rotor, internal ring gears formed on the rotor and meshing with the pairs of relatively small gears carried by the arms, a plurality of stator coils disposed around the rotor coils, a pair of spaced collector rings, and brushes electrically connected to the rotor coils and carried by the rotor arranged to engage said collector rings.

In testimony whereof I affix my signature.

ALVAH L. POWELL.